US008755314B2

(12) United States Patent
Park et al.

(10) Patent No.: US 8,755,314 B2
(45) Date of Patent: Jun. 17, 2014

(54) METHOD OF OPERATING A SLEEP MODE IN A WIRELESS COMMUNICATION SYSTEM (75) Inventors: Gi Won Park, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 12/708,316

(22) Filed: Feb. 18, 2010

(65) Prior Publication Data

US 2010/0232329 A1 Sep. 16, 2010

Related U.S. Application Data (60) Provisional application No. 61/153,303, filed on Feb. 18, 2009, provisional application No. 61/154,779, filed on Feb. 24, 2009, provisional application No. 61/156,879, filed on Mar. 3, 2009.

(30) Foreign Application Priority Data

Apr. 30, 2009 (KR) ........................ 10-2009-0038221

(51) Int. Cl.
G08C 17/00 (2006.01)
(52) U.S. Cl.
USPC ........................................................ 370/311
(58) Field of Classification Search
CPC .................................................. H04W 52/02
USPC .................... 370/311; 714/748; 455/436, 419
See application file for complete search history.

(56) References Cited

U.S. PATENT DOCUMENTS

| 7,924,756 | B2 * | 4/2011 | Son et al. ........................ 370/311 |
| 2003/0164752 | A1 | 9/2003 | Haimovitch et al. |
| 2006/0120314 | A1 * | 6/2006 | Krantz et al. .................. 370/311 |
| 2007/0206524 | A1 | 9/2007 | Suk |
| 2007/0218939 | A1 | 9/2007 | Lim et al. |
| 2008/0188223 | A1 * | 8/2008 | Vesterinen et al. ........... 455/436 |
| 2009/0042553 | A1 * | 2/2009 | Lavi .............................. 455/419 |
| 2010/0002612 | A1 * | 1/2010 | Hsu et al. ....................... 370/311 |
| 2010/0131814 | A1 * | 5/2010 | Chiu ............................. 714/748 |

FOREIGN PATENT DOCUMENTS

| EP | 1450240 | 8/2004 |
| JP | 2004234667 | 8/2004 |
| KR | 10-2007-0050890 | 5/2007 |
| KR | 10-2008-0074698 | 8/2008 |

(Continued)

OTHER PUBLICATIONS

European Patent Office Application Serial No. 10743940.8, Search Report dated Jun. 4, 2013, 6 pages.

*Primary Examiner* — Mark Rinehart
*Assistant Examiner* — Gbemileke Onamuti
(74) *Attorney, Agent, or Firm* — Lee, Hong, Degerman, Kang & Waimey (57) ABSTRACT

A sleep mode operating method in a wireless communication system is disclosed. In a sleep mode operating method in a wireless communication system according to one embodiment of the present invention, a user equipment receives a sleep response (MOB_SLP-RSP) message including a sleep cycle and a listening window from a base station. For the listening window, the user equipment receives a last PDU indication indicating whether a PDU (protocol data unit) transmitted from the base station is a last PDU. The user equipment terminates the listening window according to the last PDU indication.

10 Claims, 4 Drawing Sheets

(56) References Cited

FOREIGN PATENT DOCUMENTS

| KR | 10-2008-0089323 | 10/2008 |
| WO | 2008/057296 | 5/2008 |
| WO | 2008/117985 | 10/2008 |

\* cited by examiner

METHOD OF OPERATING A SLEEP MODE IN A WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Application No. 10-2009-38221, filed on Apr. 30, 2009, and also claims the benefit of U.S. Provisional Application Ser. Nos. 61/153,303, filed on Feb. 18, 2009, 61/154,779, filed on Feb. 24, 2009, and 61/156,879, filed on Mar. 3, 2009, the contents of which are all incorporated by reference herein in their entirety.

BACKGROUND OF THE INVENTION

1. Field of the Invention

The present invention relates to a wireless communication system, and more particularly, to a method of operating a sleep mode in a wireless communication system.

2. Discussion of the Related Art

Generally, a power of a user equipment is dependent on a battery for mobility. And, it is very important to reduce power consumption of the user equipment. Various methods have been proposed to reduce the power consumption. And, one of the various methods related to a sleep mode.

In the sleep mode, power consumption can be reduced in a manner of holding an operation of a user equipment having no more traffic to transceive with a base station.

In case of having no more traffic to transceive with a base station in the course of performing communication with the base station in normal or active mode, a user equipment sends a sleep request (hereinafter named MOB_SLP-REQ) for entering a sleep mode to the base station. Having received the MOB_SLP-REQ message, the base station sends a sleep response (hereinafter named MOB_SLP-RSP) including such parameters related to the sleep mode of the user equipment as an initial sleep cycle, a listening window and the like to the user equipment.

Having received the MOB_SLP-RSP message, the user equipment enters the sleep mode using the parameters related to the sleep mode.

During the sleep mode, the user equipment alternately repeats a sleep interval and a listening interval. The user equipment is able to transceive data with the base station for the listening interval but is unable to transceive data with the base station. Therefore, data arriving at the base station is buffered during the sleep interval.

According to a related art, the user equipment stays in a listening state during the listening window included in the MOB_SLP-REQ message. Therefore, even if the base station has no data to transmit to the user equipment, the user equipment keeps maintaining the listening state during the listening window included in the MOB_SLP-REQ message, thereby wasting its power.

As mentioned in the foregoing description, according to the related art, even if a base station has no data to transmit to a user equipment, the user equipment keeps maintaining a listening state, thereby wasting its power.

SUMMARY OF THE INVENTION

Accordingly, the present invention is directed to a method of operating a sleep mode in a wireless communication system that substantially obviates one or more problems due to limitations and disadvantages of the related art.

An object of the present invention is to provide a method of operating a sleep mode, by which power consumption of a user equipment can be reduced.

Another object of the present invention is to provide a user equipment for performing a sleep mode operation to reduce power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating a sleep mode of a user equipment in a wireless communication system according to the present invention includes the steps of receiving a PDU (protocol data unit) including an indicator indicating to terminate a listening window from a base station and terminating the listening window according to indication of the received indicator.

Preferably, the indicator is transmitted by being included in a sleep control extended header (SCEH) or a sleep control header (SCH).

Preferably, the indicator is a last PDU indicator indicating that the PDU is a last PDU indicator the base station is going to transmit or a listening window termination flag.

More preferably, the last PDU indicator is transmitted by being included in an A-MAP.

Preferably, the method further includes the step of receiving a listening window termination delay timer from the base station. In this case, the listening window terminating step includes the steps of after receiving the last PDU indicator or the listening window termination flag, standing by for the listening window terminating delay timer, and terminating the listening window if failing to receive a downlink PDU for standing by for the listening window terminating delay timer.

More preferably, the method includes the steps of extending the listening window if failing to terminate traffic transceiving with the base station for the listening window, receiving the listening window termination flag for the extended listening window, and stopping extending the listening window according to the listening window termination flag.

In another aspect of the present invention, a mobile station (MS) for operating a sleep mode in a wireless communication system includes a means for receiving a PDU (protocol data unit) including an indicator indicating to terminate a listening window from a base station and a means for terminating the listening window according to and indication of the received indicator.

Preferably, the indicator is transmitted by being included in a sleep control extended header (SCEH) or a sleep control header (SCH).

More preferably, the indicator includes a last PDU indicator indicating that the PDU is a last PDU indicator the base station is going to transmit or a listening window termination flag. In this case, the last PDU indicator is transmitted by being included in an A-MAP.

Preferably, the user equipment further includes a means for receiving a listening window termination delay timer from the base station. In this case, the means for terminating the listening window, after receiving the last PDU indicator or the listening window termination flag, stands by for the listening window terminating delay timer and then terminates the listening window if failing to receive a downlink PDU for standing by for the listening window terminating delay timer.

More preferably, the user equipment further includes a means for extending the listening window if failing to terminate traffic transceiving with the base station for the listening window, a means for receiving the listening window termination flag for the extended listening window, and a means for stopping extending the listening window according to the listening window termination flag.

Accordingly, the present invention provides the following effect and/or advantage.

First of all, in case that a base station has no more traffic to transmit to a user equipment, the base station transmits a last PDU indication or a listening window termination flag to enable the user equipment to terminate a listening window, whereby power consumption of the user equipment can be reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings, to facilitate those having ordinary skill in the art to implement the invention. The present invention can be implemented in various forms, which is non-limited by the following embodiments. To clearly describe the present invention, parts irrespective of the description are omitted from the drawings. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

In the following description, a terminal may include fixed advanced mobile stations (AMSs), for example, a user equipment (UE), a mobile station (MS) and the like. Also, the base station (BS) may refer to an arbitrary node of a network end which communicates with the above terminal, and may include a Node B (Node-B), an eNode B (eNode-B), and an access point (AP) and the like.

A sleep mode operating method according to an embodiment of the present invention is explained in detail with reference to FIGS. 1 to 3 as follows.

First of all, in a sleep mode operating method according to an embodiment of the present invention, if a base station has no more data to transmit to a user equipment in a listening window, the base station transmits a last PDU (protocol data unit) indication or a listening window termination flag to the user equipment. Having received the last PDU indication or the listening window termination flag, the user equipment terminates a listening window and then enters a sleep mode.

In case of having no more traffic to transceive with the base station, the user equipment in normal mode sends a sleep request (hereinafter named MOB_SLP-REQ) message for entering a sleep mode to the base station. Having received the MOB_SLP-REQ message, the base station sends a sleep response (hereinafter named MOB_SLP-RSP) message to the user equipment in response to the MOB_SLP-REQ message. In this case, such parameters related to the sleep mode of the user equipment as an initial sleep cycle, a final sleep cycle, a listening window and the like are included in the MOB_SLP-RSP message.

During the sleep mode, the user equipment alternately repeats a sleep interval impossible to transceive data with the base station and a listening interval possible to transceive data with the base station. If the user equipment enters the sleep mode, it maintains a sleep state for an initial sleep cycle and then repeats a sleep cycle constructed with one sleep interval and one listening interval after completion of the initial sleep cycle. According to whether there exists the traffic the base station transmits to the user equipment, the user equipment changes a length of the sleep cycle. In this case, the length of the sleep cycle should not exceed a final sleep cycle received from the base station. A length of the listening interval is determined according to a listening window of the MOB_SLP-RSP message. And, a length of the sleep interval results from subtracting a listening window from the sleep cycle.

Having received the MOB_SLP-RSP message, the user equipment makes a transition to the sleep mode.

Alternatively, even if the user equipment does not send the sleep request message, the base station sends an unsolicited MOB_SLP-RSP to the user equipment to enable the user equipment to enter the sleep mode.

Figure 1:
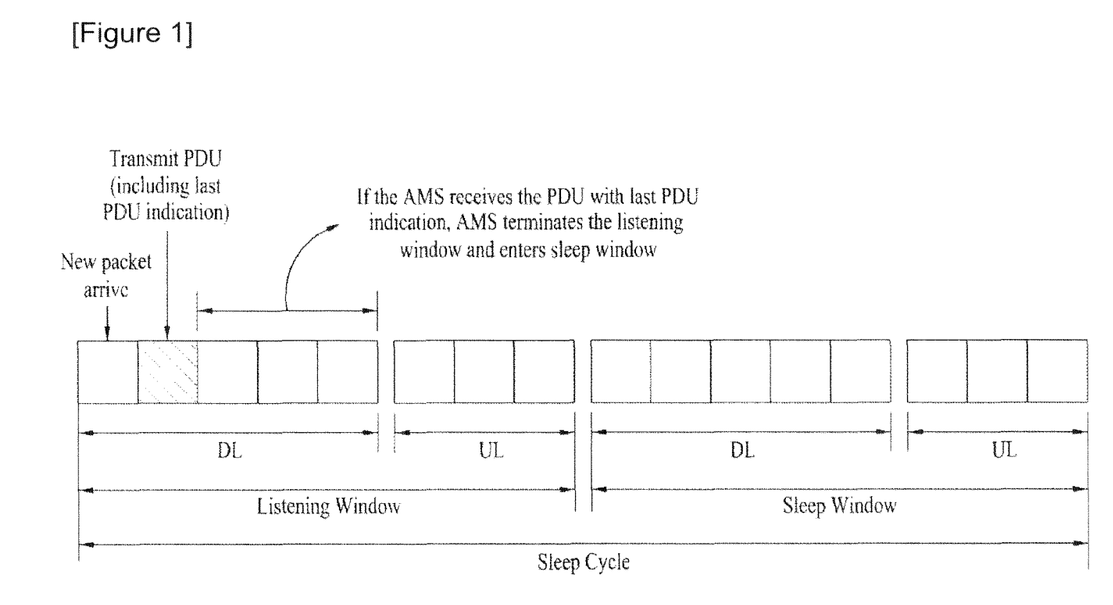
FIG. 1 is a diagram for a sleep mode operating method according to an embodiment of the present invention.

FIG. 1 is a diagram for a sleep mode operating method according to an embodiment of the present invention.

FIG. 1 shows a sleep cycle including a pair of frames. Referring to FIG. 1, one frame includes 5 downlink (DL) subframes and 3 uplink (UL) subframes. And, a sleep cycle includes a listening window and a sleep window.

Referring to FIG. 1, while a user equipment stays in a listening window, if DL traffic, which is to be transmitted to the user equipment, arrives at a base station, the base station transmits a DL PDU (downlink protocol data unit) carried on a next subframe. Yet, since PDU to be transmitted to the user equipment does not exist in a buffer of the base station any more, if a currently transmitted PDU is a last PDU, the base station transmits a last PDU indication or a listening window termination flag to the user equipment.

In the following description, explained is a case that a base station transmits a last PDU indication to a user equipment.

First of al, a base station is able to transmit a last PDU indication in a manner that the last PDU indication is included as an extended sub-header (or called an extended header) in a PDU. A last PDU indication extended sub-header can have two kinds of formats. Table 1 shows a first last PDU indication extended sub-header format, and Table 2 shows a second last PDU indication extended sub-header format.

TABLE 1

| Name | Size (bit) | Description |
|---|---|---|
| Last PDU indication | 1 | 0: PDU to keep being transmitted in DL exists in a buffer of a base station. 1: Last PDU (PDU to be delivered in DL by a base station does not exist.) |

Referring to Table 1, according to a first last PDU indication extended sub-header format, if a PDU to be transmitted is not a last PDU, a base station sets a last PDU indication to 0 and then transmits it to a user equipment. If a PDU to be transmitted is a last PDU, the base station sets a last PDU indication to 1 and then transmits it to the user equipment.

Having received the last PDU indication, if the received last PDU is set to 9, the user equipment recognizes that the base station will keep transmitting PDUs to itself and then monitors a DL channel during a remaining listening window. If the last PDU indication is set to 1, the user equipment recognizes that the received PDU is the last PDU transmitted by the base station and then terminates the listening window to reduce its power consumption.

TABLE 2

| Name | Size (bit) | Description |
|---|---|---|
| Last PDU indication | 1 | 0: PDU to keep being transmitted in DL exists in a buffer of a base station. 1: Last PDU (Buffered PDU to be delivered in DL by a base station does not exist any more.) |

Referring to Table 2, according to a second last PDU indication extended sub-header format, if a PDU to be transmitted is a last PDU, a base station transmits the PDU to a user equipment in a manner that a last PDU indication is included in the PDU. If a PDU to be transmitted is not a last PDU, a base station does not transmit a last PDU indicator to a user equipment. According to the second last PDU indication extended sub-header format, since a last PDU indication is inserted in a last PDU only, the second last PDU indication extended sub-header format is able to reduce an overhead smaller than that of the first d last PDU indication extended sub-header format.

According to Table 1 or Table 2, a base station transmits a last PDU indication via a newly defined last PDU indication extended sub-header. Besides, the base station is able to transmit a last PDU indication via a previously defined extended sub-header as well. For instance, a last PDU indication is included in a DL sleep control extended sub-header and is then transmitted.

Moreover, the base station is able to transmit a last PDU indication in a manner that the last PDU indication is included in an A-MAP (advanced MAP) that is checked in advance by the user equipment to receive a DL PDU.

Figure 2:
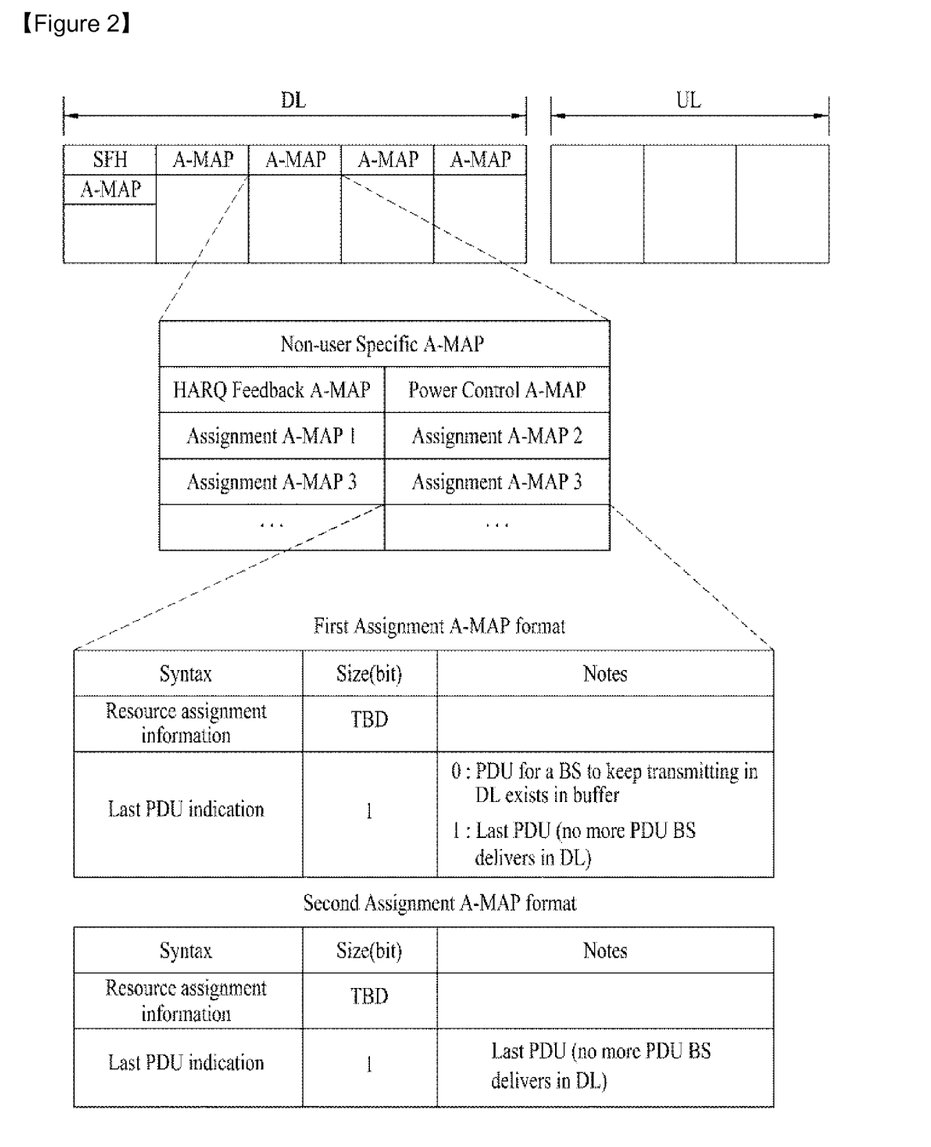
FIG. 2 is a diagram of A-MAP including a last PDU indication according to an embodiment of the present invention.

FIG. 2 is a diagram of A-MAP including a last PDU indication according to an embodiment of the present invention. Referring to FIG. 2, a base station transmits an A-MAP to inform a user equipment of a location of data to transmit. In this case, the A-MAP includes an assignment A-MAP. And, a last PDU indication can be transmitted by being included in the assignment A-MAP.

Assignment A-MAP according to an embodiment of the present invention can have two kinds of formats.

Referring to FIG. 2, according to a first assignment A-MAP format, if a PDU transmitted at a location indicated by an A-MAP is not a last PDU, a last PDU indication is set to 0. If a PDU transmitted at a location indicated by an A-MAP is a last PDU, a last PDU indication is set to 1.

According to a second assignment A-MAP format, if a PDU transmitted at a location indicated by an A-MAP is a last PDU, a last PDU indication is included in an assignment A-MAP. If a PDU transmitted at a location indicated by an A-MAP is not a last PDU, a last PDU indication is not included in the assignment A-MAP.

A base station is able to transmit a listening window termination delay timer (T_AMS Timer) to a user equipment together with a last PDU indication. If the base station transmits the last PDU indication to the user equipment, the user equipment immediately terminates a listening window as soon as receives the last PDU indication. Yet, although there is no PDU to be transmitted to the user equipment by a buffer at a timing point that the base station transmits a last PDU, a PDU to be transmitted to the user equipment may be generated before the listening window of the user equipment is terminated. Therefore, if the base station transmits the listening window termination delay timer to the user equipment together with the last PDU indication, the user equipment receives the last PDU indication, stands by for the listening window termination delay timer, and is then able to terminate the listening window if there is no incoming PDU for the listening window termination delay timer.

In the following description, explained is a case that a base station transmits a listening window termination flag to a user equipment.

First of all, a base station is able to transmit a listening window termination flag in a manner that the listening window termination flag is included in a PDU. In doing so, the listening window termination flag is added to a DL sleep control extended sub-header of the PDU and is then transmitted to the user equipment.

Tables 3 to 5 show formats of DL sleep control extended sub-header including a listening window termination flag therein.

TABLE 3

| Name | Size (bit) | Description |
|---|---|---|
| listening window termination flag | 1 | If a listening window termination flag is set, a UE receives the listening window termination flag and then terminates a listening window. |

According to a DL sleep control extended sub-header format shown in Table 3, in order for a user equipment to terminate a listening window, a base station transmits a listening window termination flag by having it included in a DL sleep control extended sub-header. If receiving the DL sleep control extended sub-header including the listening window termination flag therein, the user equipment terminates a listening window and then enters a sleep window.

TABLE 4

| Name | Size (bit) | Description |
|---|---|---|
| listening window termination flag | 1 | 0: Having received it, a UE does not terminate a listening window.<br>1: Having received it, a UE terminates a listening window. |

According to a DL sleep control extended sub-header format shown in Table 4, a base station transmits a listening window termination flag by having it included in a DL sleep control extended sub-header. In order for a user equipment to terminate a listening window, the base station transmits listening window termination flag by having it set to 1. Otherwise, the base station transmits a listening window termination flag by having it set to 0.

TABLE 5

| Name | Size (bit) | Description |
|---|---|---|
| listening window termination flag | 1 | If a listening window termination flag is set, a UE receives the listening window termination flag and then terminates a listening window. |
| If (listening window termination flag = 1) { | | |
| Listening window termination delay timer | | Time (frame or subframe) for standby until listening interval termination after a UE has received a sleep control extended sub-header |

Referring to Table 5, a sleep control extended sub-header can include a listening window termination delay timer.

According to a DL sleep control extended sub-header format shown in Table 4, in transmitting a last PDU to a user equipment, a base station sets a listening window termination flag of a DL sleep control extended sub-header included in the last PDU to 1, adds a listening window termination delay timer to the DL sleep control extended sub-header, and then transmits it to the user equipment.

If so, the user equipment checks the listening window termination delay timer and then stands by for the listening window termination delay timer. If there is no more DL data, the user equipment terminates a listening window and then enters a sleep window. After the listening window termination delay timer expires, the base station determines that the user equipment has entered the sleep window and does not further transmit DL PDU to the user equipment.

In Tables 3 to 5, explained is a case that a base station transmits a listening window termination flag via a DL sleep control extended sub-header. Yet, a base station newly defines an extended sub-header and is able to transmit a listening window termination flag to a user equipment via the newly defined extended sub-header.

As mentioned in the foregoing description, in case of receiving a last PDU indication or a listening window termination flag from a base station, a user equipment terminates a listening mode, thereby reducing power consumption.

A method of operating a sleep mode in a user equipment according to an embodiment of the present invention is explained in detail with reference to FIG. 3 as follows.

Figure 3:
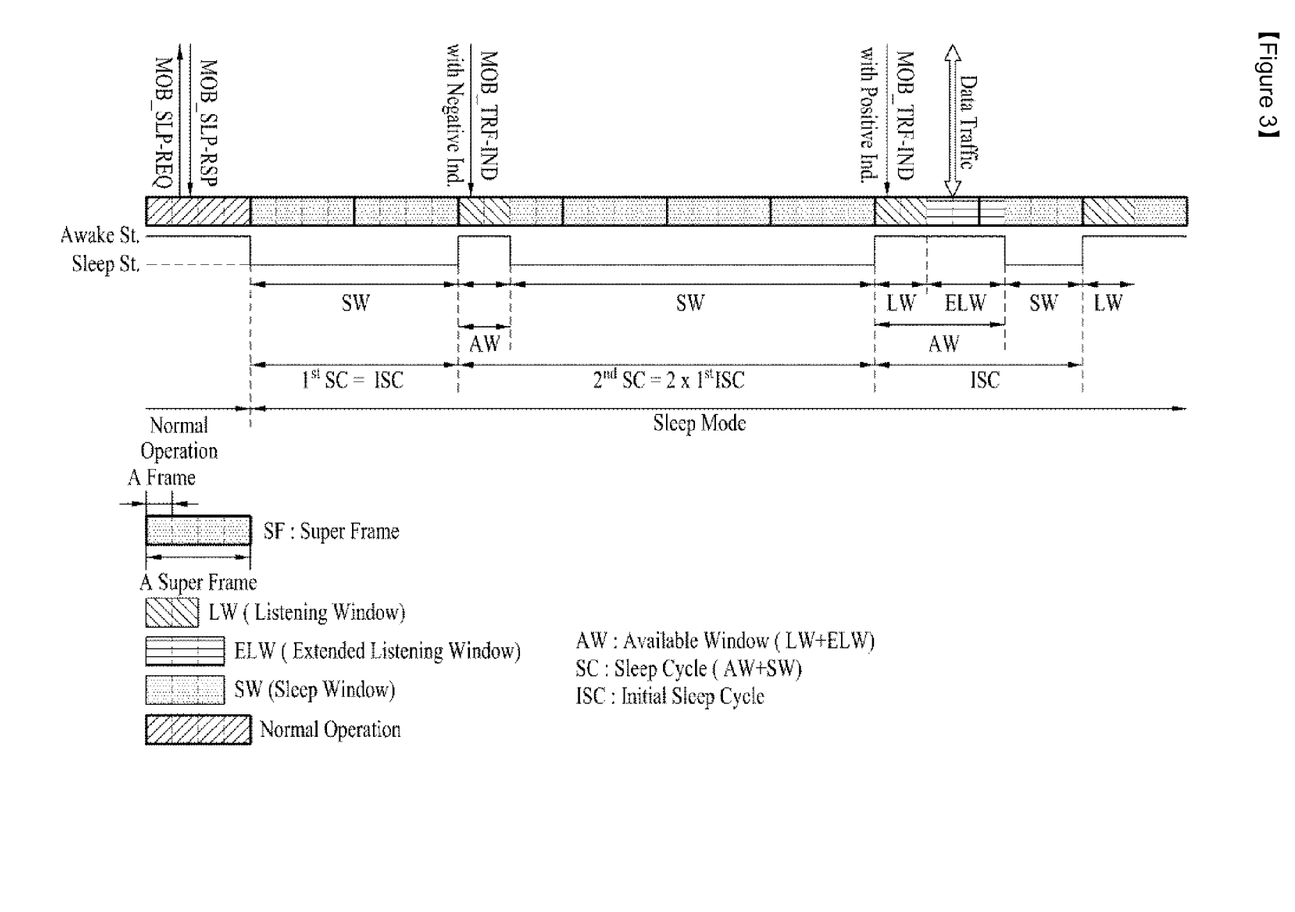
FIG. 3 is a diagram for explaining a method for a user equipment to operate in sleep mode.

FIG. 3 is a diagram for explaining a method for a user equipment to operate in sleep mode.

Referring to FIG. 3, after a user equipment has made a transition to a sleep mode from a normal mode, a first sleep cycle includes a sleep window only. And, a second sleep cycle includes a sleep window and a listening window, and so on. A length of the first sleep cycle is an initial sleep cycle included in an MOB_SLP-RSP message.

For the listening window, the user equipment receives a traffic indication (TRF-IND) message, which indicates that whether there exists traffic a base station is going to transmit to the user equipment, from the base station. If the traffic indication message includes a negative indication, it means that there is no traffic the base station is going to transmit to the user equipment. If the traffic indication message includes a positive indication, it means that there exists traffic the base station is going to transmit to the user equipment.

In FIG. 3, if the user equipment receives the traffic indication message that includes the negative indication for the listening window of the second sleep cycle, the user equipment determines that there is no traffic to be transmitted in downlink. The user equipment then increases a sleep cycle to become twice greater than a previous sleep cycle.

If the user equipment receives the traffic indication message including the negative indication, the user equipment increases a sleep cycle according to Formula 1.

$$\text{Current sleep cycle} = \min(2 * \text{previous sleep cycle}, \text{final sleep cycle}) \quad \text{[Formula 1]}$$

Referring to Formula 1, a user equipment sets a current sleep cycle to a smaller value selected from a double of a previous sleep cycle and a final sleep cycle included in an MOB_SLP-RSP message. In particular, the user equipment is unable to set the sleep cycle to a value greater than the final sleep cycle. This is to prevent the sleep cycle from increasing continuously.

For the listening window of the third sleep cycle, if the user equipment receives the traffic indication message including the positive indication, the user equipment resets the sleep cycle to the initial sleep cycle.

If receiving a last PDU indication or a listening window termination flag from the base station in the course of transceiving traffic with the base station for the listening window included in the MOB_SLP-RSP message, the user equipment terminates the listening window.

If failing to terminate the traffic transceiving with the base station for the listening window included in the MOB_SLP-RSP message, the user equipment extends the listening window and then keeps performing the traffic transceiving with the base station. For the extended listening window, if the user equipment receives the last PDU indication or the listening window termination flag from the base station in the course of transceiving the traffic with the base station, the user equipment stops the extension of the listening window and then enters the sleep window.

In the following description, the configuration of a user equipment apparatus for performing various embodiments of the present invention is schematically explained.

Figure 4:
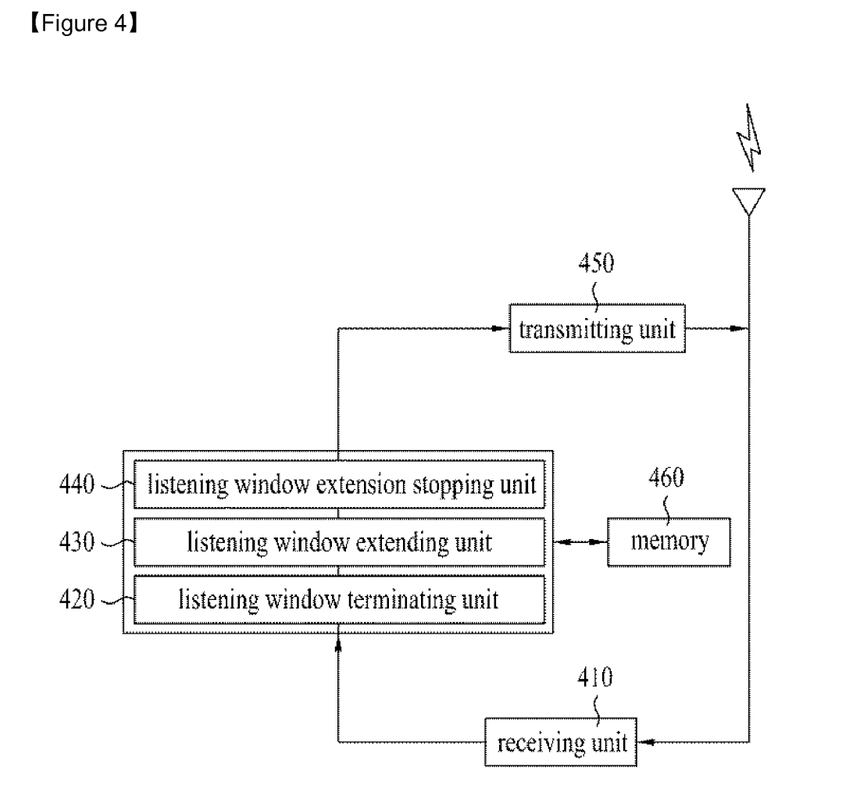
FIG. 4 is a diagram for configuration of a user equipment apparatus according to one preferred embodiment of the present invention.

FIG. 4 is a diagram for configuration of a mobile station (or user equipment) apparatus according to one preferred embodiment of the present invention.

Referring to FIG. 4, a user equipment apparatus can include a receiving unit 410, a listening window terminating unit 420, a listening window extending unit 430, a listening window extension stopping unit 440, a transmitting unit 450 and a memory 460.

The receiving unit 410 is able to receive a PDU (protocol data unit), which includes an indication indicating to terminate a listening window, from a base station. And, the receiving unit 410 is able to receive a listening window termination delay timer from the base station. Moreover, the receiving unit 410 is able to receive a listening window termination flag for an extended listening window.

The listening window terminating unit 420 is able to terminate a listening window according to the indication received by the receiving means 410. In this case, the indication can include a last PDU indication indicating that the PDU is a last PDU indication the base station is going to transmit or a listening window termination flag. The last PDU indication or the listening window termination flag can be transmitted by being included in a sleep control extension header (SCEH) or a sleep control header (SCH). Moreover, the last PDU indication can be transmitted by being included in an A-MAP. Having received the last PDU indication or the listening window termination flag, the listening window terminating unit 420 stands by for the listening window termination delay timer. If failing to receive a downlink PDU for the standby, the listening window terminating unit 420 is able to terminate the listening window.

If the traffic transceiving with the base station is not terminated during the listening window, the listening window extending unit 430 is able to extend the listening window.

The listening window extension stopping unit 440 is able to stop the extension of the listening window according to the listening window termination flag. a transmitting unit (450) may transmit a signal, data, information and like that to base station.

And, the memory 460 is able to store information externally received from the base station and the like, data, operated information and the like during a prescribed period of time. The memory 460 can be replaced by such a configuration as a buffer (not shown in the drawing) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a sleep mode operating method in a wireless communication system according to one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparently understandable that an embodiment is configured by combining claims failing to have relation of explicit citation in the appended claims together or can be included as new claims by amendment after filing an application.

What is claimed is:

1. A method of operating a listening window by a mobile station in a wireless communication system, the method comprising:
receiving a sleep response message from a base station during an active mode, the sleep response message including a length of an initial sleep cycle that comprises only a sleep window interval;
operating in a sleep mode during the initial sleep cycle based on the received sleep response message;
receiving a traffic indication message from the base station during a first listening window of a first sleep cycle after the initial sleep cycle, the first sleep cycle comprising a first sleep window and the first listening window;
resetting a length of the first sleep cycle to the length of the initial sleep cycle when the traffic indication message indicates positive traffic;
receiving an indicator from the base station during the first listening window, the indicator indicating that a specific protocol data unit (PDU) is a last PDU in a downlink (DL) buffer;
terminating the first listening window before an expiration of the first listening window according to the indicator; and
entering the first sleep window after terminating the first listening window.

2. The method of claim 1, wherein the indicator is received in a header format.

3. The method of claim 2, wherein a type of the header format is a sleep control extended header (SCEH) or a sleep control header (SCH).

4. The method of claim 1, wherein the indicator is a last PDU indicator or a listening window termination flag.

5. The method of claim 1, further comprising maintaining the first sleep window until an end of the first sleep cycle.

6. A mobile station for operating a listening window in a wireless communication system, the mobile station comprising:
a receiver configured to receive information; and
a processor configured to:
control the receiver to receive a sleep response message from a base station during an active mode, the sleep message including a length of an initial sleep cycle that comprises only a sleep window interval;
operate the mobile station in a sleep mode during the initial sleep cycle based on the received sleep response message;
control the receiver to receive a traffic indication message from the base station during a first listening window of a first sleep cycle after the initial sleep cycle, the first sleep cycle comprising a first sleep window and the first listening window,
reset a length of the first sleep cycle to the length of the initial sleep cycle when the traffic indication message indicates positive traffic;
control the receiver to receive an indicator from a base station during the first listening window, the indicator indicating that a specific protocol data unit (PDU) is a last PDU in a downlink (DL) buffer;
terminate the first listening window before an expiration of the first listening window according to the indicator; and
operate the mobile station in the first sleep window after terminating the first listening window.

7. The mobile station of claim 6, wherein the indicator is received in a header format.

8. The mobile station of claim 7, wherein the indicator is a last PDU indicator or a listening window termination flag.

9. The mobile station of claim 7, wherein a type of the header format is a sleep control extended header (SCEH) or a sleep control header (SCH).

10. The mobile station of claim 6, wherein the processor is further configured to maintain the first sleep window until an end of the first sleep cycle.

* * * * *